(No Model.)
H. SCHNEIDER.
SHAFT BEARING.
No. 424,360. Patented Mar. 25, 1890.
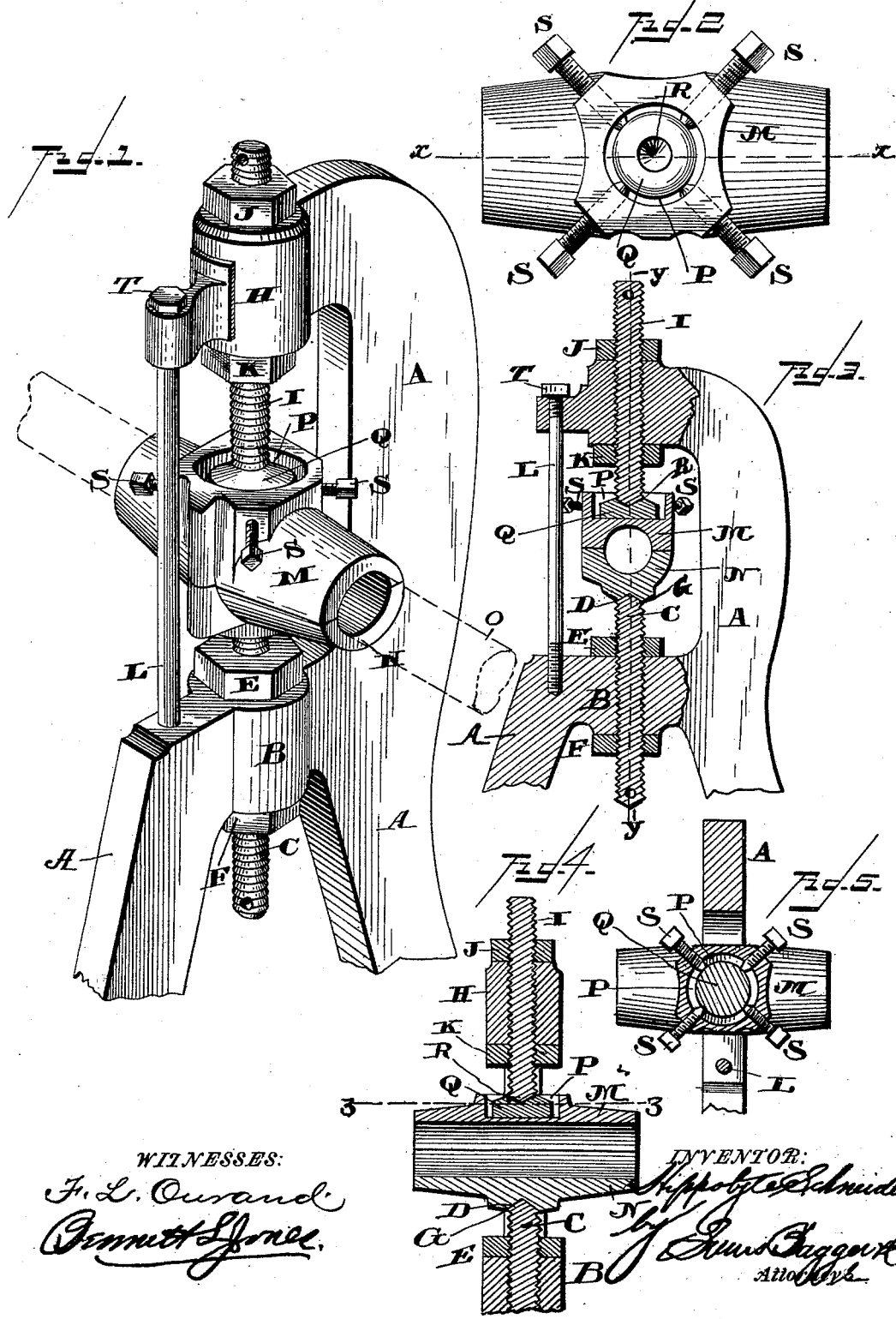
WITNESSES:
INVENTOR:

UNITED STATES PATENT OFFICE.

HIPPOLYTE SCHNEIDER, OF PITTSBURG, PENNSYLVANIA.

SHAFT-BEARING.

SPECIFICATION forming part of Letters Patent No. 424,360, dated March 25, 1890.

Application filed January 10, 1890. Serial No. 336,495. (No model.)

*To all whom it may concern:*

Be it known that I, HIPPOLYTE SCHNEIDER, a citizen of the United States, and a resident of Pittsburg, in the county of Allegheny and State of Pennsylvania, have invented certain new and useful Improvements in Shaft-Bearings; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved shaft-bearing, showing the same as applied to a floor-standard. Fig. 2 is a plan or top view of the same. Fig. 3 is a vertical sectional view on line $x\,x$ in Fig. 2. Fig. 4 is a similar view at right angles to the view shown in Fig. 3, or on the line marked $y\,y$; and Fig. 5 is a horizontal sectional view on line $z\,z$ in Fig. 4.

Like letters of reference denote corresponding parts in all the figures.

This invention has relation to so-called "universal shaft-bearings," or that class of bearings which are adapted to adjust themselves automatically to the position of the shaft; and it consists in the detailed construction and combination of parts of the automatic movable bearing which will be hereinafter more fully described and claimed.

In the present illustration of my invention I have shown the same as applied to a standard fixed upon a floor and supporting the shaft and its bearing; but it is obvious that my improvement is equally adapted for use with wall brackets or hangers.

Reference being had to the drawings, the letter A designates the standard which supports the shaft and shaft-bearing. Centrally of this post is a boss or interiorly-screw-threaded bearing B, within which works a threaded bolt C, the upper end of which is turned conical, as shown at G, to fit into the recess D in the under side of the shaft-bearing. This bolt C may be raised or lowered at will in its boss B by screwing it up or down, and may be fixed in its adjusted position by means of two tightening-nuts E F, one above and one below the boss. Thus it will be seen that by adjusting the threaded bolt or pivot C in its threaded boss or bearing, and fastening it in its adjusted position by means of the nuts E and F, it will form a firm but adjustable pivotal bearing for the movable pillow-block or shaft-bearing, shown at N. The upper part of the standard A forms a bearing for the upper side of the shaft-bearing, and is provided with a threaded boss H aligned with the corresponding threaded boss below the bearing. Through this upper boss H is inserted a threaded bolt I, which, like its mate C, is provided with two set-nuts or binding-nuts J and K, by means of which this upper threaded bolt I may be adjusted vertically in its boss H, and securely locked or fastened in its adjusted position.

In order to prevent the two bosses or bearings B and H from becoming strained or forced apart from the vibrations of the shaft, especially when the bearing is used for a very rapidly-revolving shaft, I connect the upper and lower parts of the standard by means of a rod L, provided with a nut T at its threaded end, so that the strain or tension on both sides of the bearing may be equalized by tightening down this nut.

The bearing proper consists of two parts or sections—viz., an upper part M and a lower part N—which, when placed together, form a hollow cylinder, through which the shaft (shown at O in dotted lines) is inserted. The lower part or section N is provided with a recess D for the insertion of the point G of bolt C, and the other part or section M is provided with a recess or depression P, within which is inserted a plate or bearing Q, having a recess R of such a shape as to fit the lower conical end of the upper adjusting-screw I. The recess P is large enough to permit the movable bearing-plate Q to be shifted, so that its central recess or depression R will register with the lower conical end of the upper bolt or pivotal bearing I, and after the parts I and Q have been adjusted in their proper position relative to each other plate Q is fastened within the recess in the upper bearing-section M by means of four radial binding-screws S, which work through threaded horizontal apertures in the raised rim or edge of the recess and bear with their inner ends against the sides of the circular bearing-plate Q, as will appear more clearly by reference to Fig. 5 of the drawings. In this manner it will be observed that the journal box or bearing M N proper has sufficient play upon its upper and lower pivotal bearings to enable it to yield or adjust itself automatically to any slight play or vibration of the shaft, thereby avoiding undue strain on the bearing as well as on the shaft, and the friction and wear incident to such strain. It will also be seen that the movable circular bearing-plate Q permits of lateral adjustment of the shaft-bearing, even while the shaft is running, while vertical adjustment of the bearing may be effected quickly and accurately by means of the adjustable upper and lower bolts or pivotal bearings and their respective binding-nuts.

Having thus described my invention, I claim and desire to secure by Letters Patent of the United States—

The combination of the bearing-support having vertical screw-threaded bosses located in line with each other, the threaded bolts working in said bosses, the set-nuts for fastening said bolts in their adjusted position, the box or bearing made in two sections and provided on its under side with a recess for the upper conical end of the lower bolt, and on its upper side with a circular recess, the circular movable bearing-plate located within said recess and having a central depression to receive the lower conical end of the upper bolt, and the binding-screws working through threaded radial holes in the upper section of the bearing and abutting with their inner ends against the sides of the movable bearing-plates, substantially as and for the purpose shown and set forth.

In testimony that I claim the foregoing as my own I have hereunto affixed my signature in presence of two witnesses.

HIPPOLYTE SCHNEIDER.

Witnesses:
CHARLES HUFF,
WM. HENNING.